United States Patent [19]

Hajnal

[11] 4,195,922

[45] Apr. 1, 1980

[54] SNORKEL CAMERA SYSTEM

[76] Inventor: Stephen Hajnal, 5600 Riverdale Ave., Bronx, N.Y. 10471

[21] Appl. No.: 22,880

[22] Filed: Mar. 22, 1979

[51] Int. Cl.² .................... G03B 17/48; G02B 23/08; F16L 37/24

[52] U.S. Cl. .................................. 354/79; 285/404; 350/52

[58] Field of Search ............. 354/79, 81, 62–64, 354/109, 219, 224, 286, 152, 150, 155; 114/340; 350/52; 285/404

[56] References Cited

U.S. PATENT DOCUMENTS

| 679,399 | 7/1901 | Smith et al. | 385/404 X |
|---|---|---|---|
| 725,839 | 4/1903 | Grubb | 350/52 X |
| 3,257,902 | 6/1966 | Hopkins | 350/52 X |
| 3,545,355 | 12/1970 | Cahall | 354/79 |
| 3,888,519 | 6/1975 | Smith et al. | 285/404 X |
| 3,915,564 | 10/1975 | Urban | 354/62 X |
| 4,157,216 | 6/1979 | Plummer | 354/79 X |

FOREIGN PATENT DOCUMENTS

| 17355 | of 1915 | United Kingdom | 350/52 |
|---|---|---|---|
| 489125 | 7/1938 | United Kingdom | 354/155 |
| 1232810 | 5/1971 | United Kingdom | 354/79 |
| 1286355 | 8/1972 | United Kingdom | 354/79 |

Primary Examiner—Donald A. Griffin
Attorney, Agent, or Firm—Jacobs & Jacobs

[57] ABSTRACT

A snorkel camera system having an Amici roof prism in the snorkel tube to bend the optical path 90° and to erect and reverse the image transmitted to the prism by the shooting lens, whereby the image of the object as viewed through the eyepiece of a camera body attached to the snorkel tube is erect and non-reversed.

8 Claims, 3 Drawing Figures

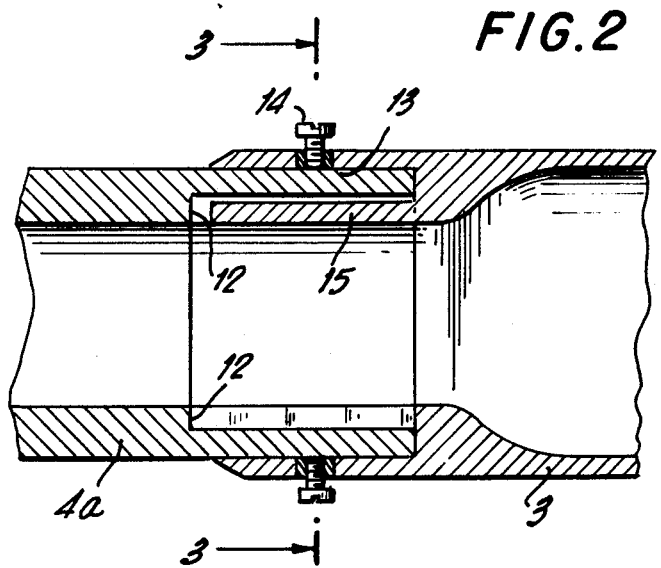
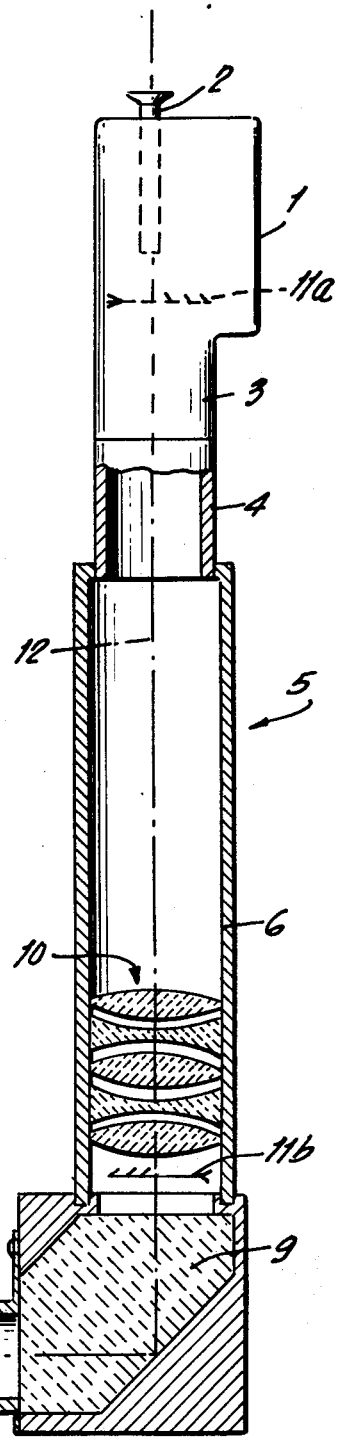
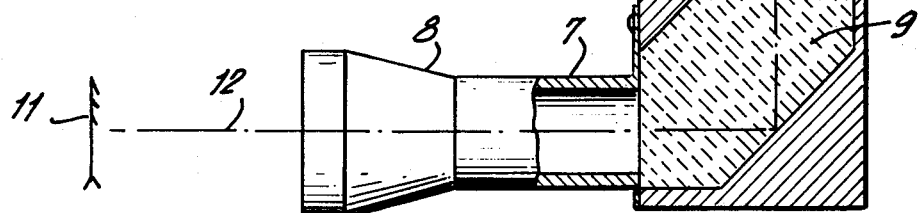

SNORKEL CAMERA SYSTEM

The present invention relates to a snorkel camera system.

Snorkel camera systems are well known. One system comprises a tubular housing having a lens system therein and being adapted for connection to a camera body of a motion picture film camera, a television camera or a videotape recorder. In use, the long snorkel tube is held vertically and a mirror at the light-entry end of the tube turns the optical path from the object to the camera through an angle of 90°. Another snorkel system has a camera lens mounted externally of the tube with a mirror inside the tube to turn the optical path 90°. Both systems require a relatively large amount of light due to the loss of film speed arising from the internal optics.

The present invention provides a faster snorkel camera system than heretofore available. This is accomplished in a manner that not only requires less exposure, but offers interchangeable lenses.

Thus, the present invention provides a snorkel camera system comprising a camera body means having a camera housing with a light admitting opening therein, means for recording images transmitted through said light admitting opening, and an eyepiece having a lens therein for viewing the object being photographed; an elongated hollow housing means having one end arranged for light entry and the other end for light egress, the light egress end of said housing means being detachably secured to said camera body means at said light admitting opening; a camera lens means detachably secured to the light-entry end of said housing means; and optical means for providing an optical path from said camera lens means through said hollow housing means to and through the light admitting opening of said camera body means; said optical means consisting essentially of a prism means in said housing means adjacent said light entry end and having a first face disposed toward said camera lens means and a second face perpendicular to said first face and disposed toward said camera body means, and a relay lens means in said housing means between said prism means and said light egress end, said prism means being operable to erect and reverse the image transmitted by said camera lens means through said first face and to transmit said erected non-reversed image to said relay lens means through said second face, whereby an erect non-reversed image of the object is viewed through said eyepiece. An upside down reversed image is transmitted to the film plane, as is conventional.

The present invention is illustrated in terms of a preferred embodiment in the accompanying drawing, in which:

FIG. 1 is a diagrammatic view, partly in section, of the camera snorkel system of the invention; and FIG. 2 is an enlarged detail view, in section, of a preferred camera mounting mechanism; and FIG. 3 is a view, in section, taken along lines 3—3 of Fig. 2.

FIG. 1 shows the snorkel system of the invention, comprising a conventional motion picture camera body 1, having an eyepiece 2 and a lens mount 3 connected to a mounting ring 4 of a snorkel assembly 5. Camera body 1 has the usual film advancing mechanism (not shown) and is a fully operational camera minus the camera lens itself.

The snorkel assembly 5 includes a tubular housing 6 having a lens mount 7 at its lowermost end to which is connected a camera lens 8 of desired optical characteristics. Adjacent lens mount 7 is an Amici roof prism 9, and a relay lens system 10 is located above prism 9.

The operation of the snorkel system of the invention is as follows. The object 11 to be photographed is viewed through the lens of eyepiece 2 and the optical path 12 of the snorkel system is through lens 8, roof prism 9, relay lens system 10 to the eyepiece 2 of camera body 1. Camera body 1 is provided with conventional beam splitter means (not shown) to transmit the image of object 11 onto a film (not shown) and a viewing screen (not shown), as is common for single lens reflex cameras. The image transmitted to the film plane is image 11a, i.e. an upside down and reversed image. Eyepiece 2 transmits the image 11a seen on the viewing screen to the eye, and the eye "sees" an image identical to object 11, not its mirror image. This is accomplished as follows.

The image of object 11 emerges from camera lens 8 upside down and reversed. Roof prism 9 erects and reverses this image to provide an image 11b identical to the object, i.e erect and non-reversed. Image 11b is transmitted via relay lens 10 to a viewing screen (not shown) upon which image 11a is focused. Image 11a is upside down and reversed, and the lens in eyepiece 2 erects and reverses image 11a so that the eye "sees" an erect, non-reversed image identical to object 11. Since snorkel systems are often used in tight quarters, it is necessary to avoid viewing mirror images that can be confusing.

If prism 9 were replaced with a mirror to bend the optical path 12 90°, this would require a pentaprism at some point on the optical path 12 to erect and reverse the image perceived through eyepiece 2. However, when a mirror and pentaprism are used in place of prism 9 there is a loss of about two stops of exposure value when using Eastman Kodak 5247 film as compared to the use of the snorkel system of the present invention. Thus, using a 33 mm Arriflex motion picture camera and EK5247 color film, satisfactory exposures were made with the snorkel system of the present invention at 400 foot candles, as compared to the need for 800–1000 foot candles using the same camera body, camera lens and snorkel system, but employing a mirror and pentaprism in place of prism 9. This is a gain in speed of about two stops, and affords much greater flexibility in shooting.

An important advantage of the present invention is the ability to interchange shooting lenses. With the prism 9 being internal of the system, the need for an external mirror is eliminated. In consequence thereof, the camera lens 8 may be easily replaced by another lens simply by detaching it from lens mount 7. Either screw-in or bayonet mounting may be employed for lens mount 7, as desired. In prior art snorkel systems, the external mirror is rigidly attached to the shooting lens or the shooting lens is inside of the snorkel tube, making on-the-spot replacement of the shooting lens impractical or impossible. Lens mount 7 will accept lenses for 16 mm and 35 mm cameras as is known.

Preferably, camera lens 8 is a wide angle lens, such as of 28 mm or 50 mm focal length. Zoom lenses can also be used. When using a wide angle lens, the snorkel system can approach the object as close as 9.8 mm for 35 mm cameras and 5.7 mm for 16 mm cameras, and this, together with the reduced exposed requirements of 400 foot candles (200 foot candles with pushing), provide the snorkel system of the present invention with almost limitless capabilities.

Camera body 1 will generally be a motion picture film camera, but may also be a television camera or videotape camera. The snorkel system 5 is readily attached to the lens mount of a television or videotape camera, which is then employed in the normal manner. Alternatively, the television or videotape camera (not shown) can be attached directly to the eyepiece 2 of the camera body 1 (which can be loaded or not).

Fig. 2 illustrates a preferred embodiment of the invention, in which the camera mount 4a is provided with four, radially spaced keyways 12. Motion picture film cameras conventionally include a key such as key 15, and thus the camera mount 4a will be compatible with such cameras. Providing four keyways 12 spaced at 90° intervals enables the user to rotate tube 6 about its axis to position the lens 8 in the desired attitude with respect to the camera body 1. To aid in securing the lens mount 3 to the camera mount 4a, pins 14 are screwed tightly into circumferentially extending groove 13.

Amici roof prisms are commercially available, e.g. from Edmund Scientific Company, Barrington, N.J. (see their spring/summer 1979 catalog) and from Pyramid Optical Corporation, Irvine, Calif.

What is claimed:

1. A snorkel camera system, comprising a camera body means having a camera housing with a light admitting opening therein, means for recording images transmitted through said light admitting opening, and an eyepiece having a lens therein for viewing the object being photographed; an elongated hollow housing means having one end arranged for light entry and the other end for light egress, the light-egress end of said housing means being detachably secured to said camera body means at said light admitting opening; a camera lens means detachably secured to the light-entry end of said housing means; and optical means for providing an optical path from said camera lens means through said hollow housing means to and through the light admitting opening of said camera body means; said optical means consisting essentially of a prism means in said housing means adjacent said light entry end and having a first face disposed toward said camera lens means and a second face perpendicular to said first face and disposed toward said camera body means, and a relay lens means in said housing means between said prism means and said light egress end, said prism means being operable to erect and reverse the image transmitted by said camera lens means through said first face and to transmit said erected non-reversed image to said relay lens means through said second face, whereby an erect non-reversed image of the object is viewed through said eyepiece.

2. The system according to claim 1, wherein said camera body means is a motion picture camera body.

3. The system according to claim 2, wherein said motion picture camera body means is a 16 mm or 35 mm single lens reflex camera body.

4. The system according to claim 1, wherein said camera body is a television camera or a videotape camera body.

5. The system according to claim 1, wherein said prism means is an Amici roof prism.

6. The system according to claim 1, wherein said housing means has a camera mount at said light-egress end, said camera mount comprising a plurality of keyways spaced radially about said light-egress end and extending inwardly of said housing, and said camera body means has a key for insertion in any desired one of said keyways.

7. The system according to claim 6, including cooperating means on said housing means and said camera body means for detachably securing said camera body means to said housing means.

8. The system according to claim 1, wherein said prism means is a roof prism means.

* * * * *